Jan. 4, 1927.
L. S. BOYD
1,613,555
DRILLING APPARATUS
Filed Jan. 11, 1926
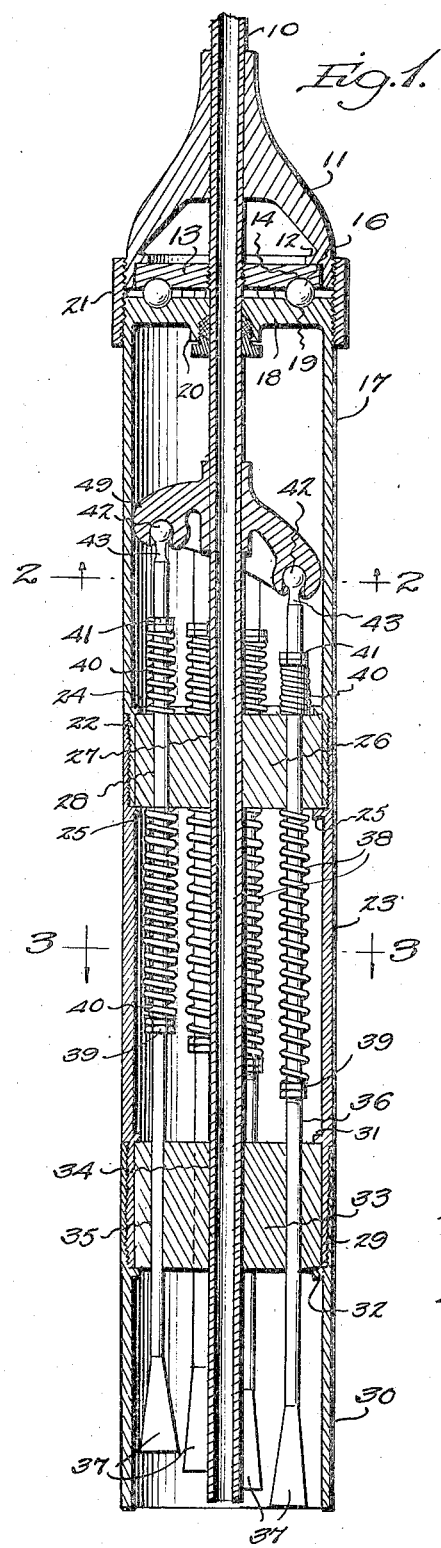
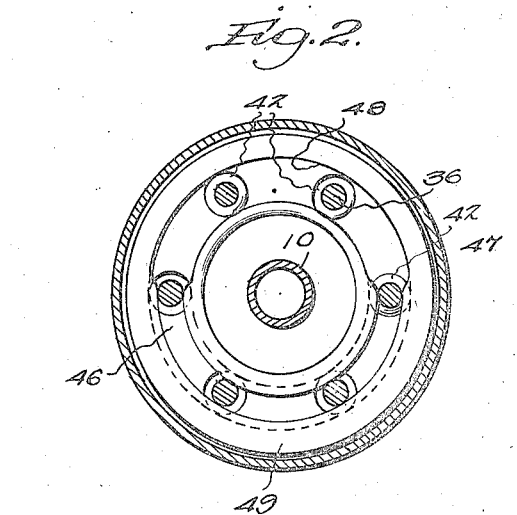
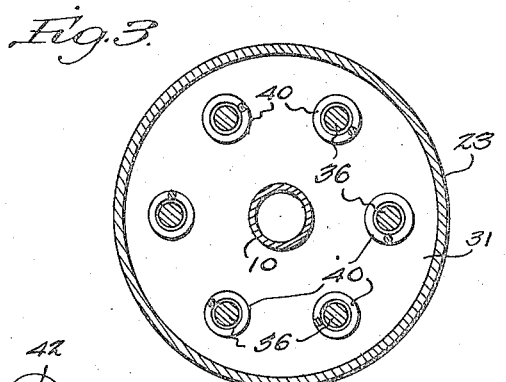
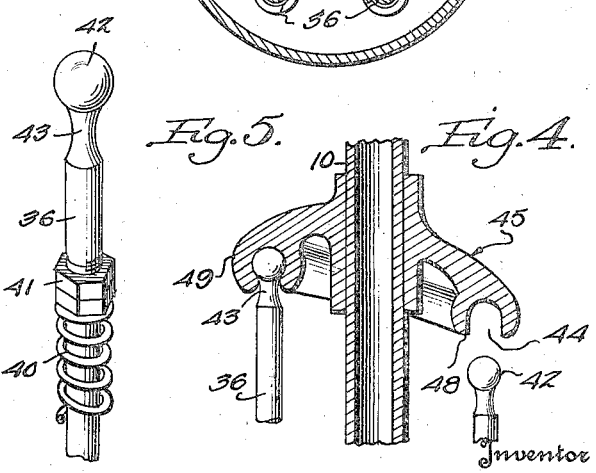
Inventor
L. S. BOYD Patented Jan. 4, 1927.

1,613,555

UNITED STATES PATENT OFFICE.

LEMUEL S. BOYD, OF SHREVEPORT, LOUISIANA.

DRILLING APPARATUS.

Application filed January 11, 1926. Serial No. 80,654.

This invention relates to drills and more particularly to a drilling apparatus particularly adapted for drilling oil wells.

An important object of the invention is to provide a drill of the impact type having a plurality of bits adapted to be successively reciprocated.

A further object is to provide a device of the above mentioned character having a plurality of circularly arranged impact bits and common means for actuating said bits whereby they are successively lifted and released to permit springs associated with the bits to drive them downwardly into the earth or the like.

A still further object is to provide a plurality of circularly arranged bits each having a coil spring associated therewith and adapted to exert a downward force, each of the bits being further provided at its upper end with a ball adapted to be engaged by a cam groove formed in a rotatable member whereby the bits are successively lifted and released to permit the springs to drive the bits downwardly.

Other objects and advantages of the invention will become apparent during the course of the following description.

In the drawings I have shown one embodiment of the invention. In this showing:

Figure 1 is a central vertical sectional view,

Figure 2 is a section on line 2—2 of Figure 1,

Figure 3 is a similar view on line 3—3 of Figure 1,

Figure 4 is a fragmentary central vertical sectional view through the operating cam and associated elements, the section being taken at right angles to Figure 1, and, Figure 5 is a detail perspective view of the upper end of one of the drill bits and associated elements.

Referring to the drawings the numeral 10 designates a tubular operating shaft which is rotatably received in a head 11. This head is provided at its lower end with a shoulder 12 below which is arranged a plate 13 threaded on the tubular driving member 10, as shown. The plate 13 is provided in its lower face with a ball race 14 in which are arranged ball bearings 16.

A cylindrical member 17 is arranged beneath the head 11, as shown in Figure 1. The cylindrical member is preferably provided with an integral head 18 having a ball race 19 therein to receive the balls 16. It will be apparent that the balls 16 provide an anti-friction rotating connection beween the plate 13 and head 18. The head 18 may be provided with a bearing 20, and the head 11 and cylindrical member 17 may be connected by an internally threaded sleeve 21.

The cylindrical member 17 is provided at its lower end with an inwardly offset portion 22 which is externally threaded to receive the internally threaded upper end of the next adjacent cylindrical member 23. The member 23, of course, is arranged in axial alinement with and forms a substantial continuation of the member 17. The adjacent ends of the members 17 and 23 are provided with internal shoulders 24 and 25 respectively between which is mounted a bearing block 26. This block is provided centrally with a bearing opening 27 through which the tubular driving member 10 extends. The block 26 is further provided with a series of circularly arranged bearing openings 28 for a purpose to be described.

The lower end of the cylindrical member 23 is also provided with a reduced externally threaded portion 29 to receive the internally threaded upper end of an additional cylindrical section 30. Similarly the adjacent ends of the sections 23 and 30 are provided with internal shoulders 31 and 32 between which is arranged another bearing block 33 similar to the block 26. The block 33 is provided with a central bearing opening 34 for the reception of the tubular drive member 10, and is also provided with a plurality of circularly arranged bearing openings 35 arranged in alinement with the openings 28. The cylindrical section 30 extends downwardly a substantial distance beyond the block 33, and the tubular drive member 10 terminates preferably a slight distance above the lower end of the cylindrical section 30.

A plurality of drill rods 36 are arranged to reciprocate in the openings 28 and 35. Each of the rods 36 is provided at its lower end with a suitable drill bit 37. Coil springs 38 surround the rods intermediate the blocks 26 and 33 and the upper ends of these springs contact with the lower face of the block 26 while the lower ends of the springs are supported by nuts or the like 39 secured to the rods 36. The springs 38 are adapted to normally exert a considerable downward force on the rods 36.

Above the block 26, the rods 36 are surrounded by smaller coil springs 40, the lower ends of which contact with the upper face of the block 26 while the upper ends of the springs bear against nuts or the like 41 secured to the rods 36. At their upper ends, the rods 36 are provided with ball ends 42 which are connected to the rods by reduced necks 43. The balls 42 are adapted to be received in a cam groove 44 formed in a rotatable member or cam 45 secured in any suitable manner to the rotatable member 10. As shown in Figures 1 and 2 the cam groove is provided with high and low points 46 and 47 respectively. The deeper portion of the cam groove is substantially equal in diameter to the balls 42, and substantially half the groove is substantially equal in width throughout its depth as at 48. The opposite half of the cam groove is reduced at its lower end as at 49, to fit around the ball, as will be apparent.

The operation of the device is as follows:

Any number of sections of the tubular driving member may be employed and it will be apparent that the weights of the sections and the weight of the device itself tend to seat the lower end of the cylindrical section firmly against the bottom of the hole being drilled, thus preventing rotation of the cylindrical sections and the rotation of the drill rods about the axis of the cylindrical sections. Rotation of the driving member 10 rotates the cam 45, as will be apparent. The springs 38 normally exert a downward force tending to maintain the drill rods in lower position with the upper coil springs 40 compressed. With the drill rods in their lowermost positions, the balls 42 thereof are arranged at a height corresponding to that of the lower end of the wider portion 48 of the cam groove, and thus it will be apparent that rotation of the cam 45 causes the balls 42 to successively enter the wider portions of the cam grooves. The balls are then successively picked up by the low point of the narrow portion of the cam groove, and the portions 49 thereof serve to lift the balls, thus elevating the drill rods and bits. This lifting action continues until each ball is elevated to the high point of the narrow portion of the cam groove whereupon it passes into the wide portion of the groove to be released. As each ball is thus released from the cam groove the springs 38 immediately drive the bits downwardly to accomplish the drilling action, downward movement of the drill rods being cushioned as they approach their lower limits of movement, by the springs 40. The springs 40 also serve to hold each drill rod in proper position whereby its ball will be picked up by the narrow portion of the cam groove as the cam 45 is rotated. It will therefore be apparent that the drilling action is accomplished by successively impacting the series of circularly arranged drill bits into the earth.

The bits 37 or the balls and necks 42 and 43 may be formed separately from the drill rods to permit the latter to be assembled with the springs and bearing blocks 26, as will be apparent. The blocks are clamped in position between the shoulders 24 and 25, and the shoulders 31 and 32, and the cylindrical sections easily may be separated to permit repairs to the parts. The weight of the rotating elements and the tension placed on these elements by the springs 38, are taken up by the ball bearings 16, as will be apparent, thus materially reducing the power necessary to operate the device. When the drilling apparatus is to be lifted from the well, the end of the driving tube 10 is elevated which action of course lifts the plate 13. The upper face of the plate 13 contacts with the shoulder 12, thus effecting the elevation of the non-rotating elements. In the operation of the device, the tubular shaft 10 serves the double function of rotating the cam and providing for the supply of water to the bottom of the well as the drilling operation progresses, in the usual manner.

It is to be understood that the form of my invention herewith shown and described is to be taken as a preferred example of the same and that various changes in the shape, size and arrangement of parts may be resorted to without departing from the spirit of the invention or the scope of the subjoined claims.

I claim:

1. In a drilling apparatus, a plurality of vertical circularly arranged drill rods adapted to be reciprocated vertically, balls mounted on the upper ends of said rods, said balls being larger in diameter than the adjacent portions of said rods, springs normally urging said rods downwardly, bits carried by the lower ends of said rods, a rotatable shaft arranged centrally of and parallel to said rods, and a rotatable cam arranged above said rods and secured to said shaft, said cam having a groove inclined at an acute angle to the axis of said shaft and adapted to receive said balls, said groove having a portion equal in width throughout its depth to the diameter of said balls, the remainder of said groove being equal in width at its deeper portion to the diameter of said balls and being reduced in width at its outer portion.

2. In a drilling apparatus, a plurality of circularly arranged vertical reciprocable drill rods, bits carried by the lower ends of said rods, guides for said rods, a coil spring surrounding each of said rods and normally urging it downwardly, and a rotatable cam provided with a groove, each of said rods being provided at its upper end with a ball arranged in said groove whereby rotation of said cam is adapted to successively lift and release said rods.

3. A device constructed in accordance with claim 1 wherein the first mentioned portion of said groove is arranged at the lowermost portion of said cam.

4. In a drilling apparatus, a plurality of circularly arranged vertical reciprocable drill rods, bits carried by the lower ends of said rods, the upper ends of said rods being provided with balls larger in diameter than the adjacent portions of said rods, guides for said rods, a coil spring surrounding each of said rods and normally urging it downwardly, and a rotatable cam arranged above said rods and provided in its lower face with a groove arranged at an acute angle to said rods, said groove being provided with a lower restricted portion adapted to engage said balls beneath the centers thereof to elevate said rods, the other portions of said groove being widened at the bottom to release said balls.

In testimony whereof I affix my signature.

LEMUEL S. BOYD.